Sept. 13, 1927.  D. A. WALSH  1,642,133
RESILIENT WHEEL
Filed March 16, 1925
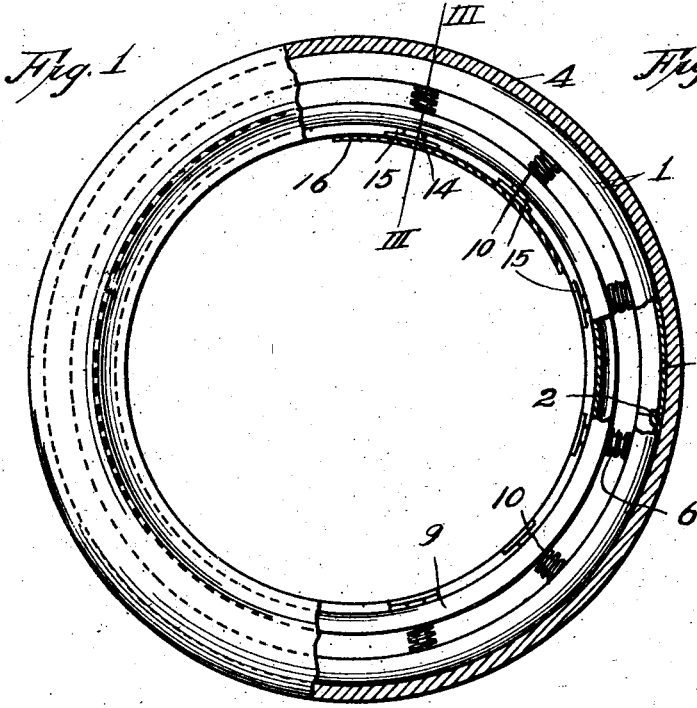
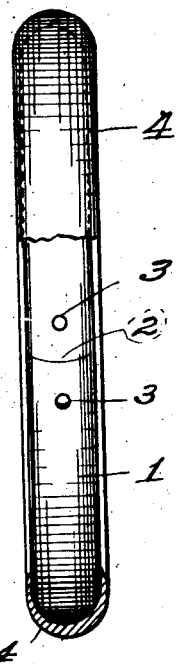
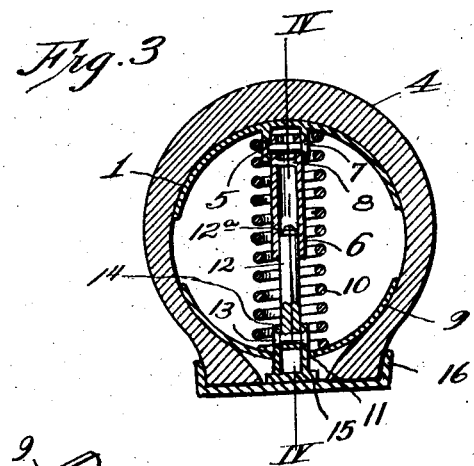
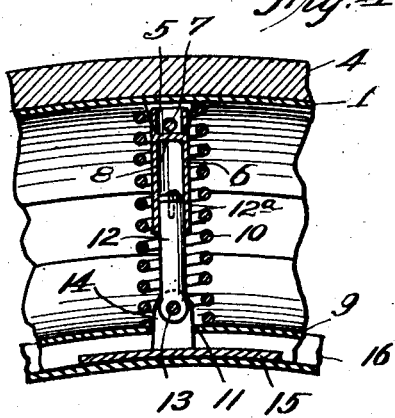
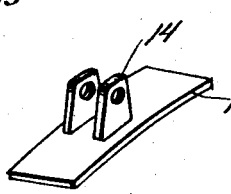
Inventor,
Delmar A. Walsh.

Patented Sept. 13, 1927.

1,642,133

UNITED STATES PATENT OFFICE.

DELMAR A. WALSH, OF KANSAS CITY, MISSOURI.

RESILIENT WHEEL.

Application filed March 16, 1925. Serial No. 15,879.

This invention relates to spring tires, and more particularly to tires adapted for use in connection with automobile wheels, and one of my objects is to produce a spring or resilient tire core which may be used with the common and ordinary type of pneumatic casing.

Another object is to produce a non-puncturable tire which is of strong, durable, efficient and inexpensive construction.

A further object is to provide means for assisting certain springs forming a part of the invention, to cushion the shock or jars transmitted by the irregularities of the roadway.

With the objects named in view, the invention consists in certain new and useful improvements as hereinafter described and claimed; and in order that it may be fully understood, reference is to be had to the accompanying drawing, in which:—

Figure 1 is a side view of a casing equipped with a resilient core embodying the invention, the casing and core being broken away to more clearly disclose certain features of construction.

Figure 2 is an edge view of the same with the casing broken away to disclose the meeting ends of the outer member of the core.

Figure 3 is an enlarged section on the line III—III of Figure 1.

Figure 4 is a view similar to Figure 3, but taken at right angles thereto on the line IV—IV thereof.

Figure 5 is a fragmental perspective view of a portion of a part of the core member.

Figure 6 is a perspective view of a foot piece or base member forming a part of the core construction.

In the said drawing, where like reference characters identify corresponding parts in all of the figures, 1 represents an internally channelled split ring of semi-circular form in cross section, and made of steel or the like. At one of its ends the ring is formed with a flange 2 for interlocking engagement with the other end, as shown in Figure 1, and said ring is provided with a pair of openings 3 on opposite sides of the joint for the insertion of suitable prys or levers for convenience in compressing the ring when it is desired to place it within an automobile casing 4, as will hereinafter appear. The inner face of the ring is formed integrally with a plurality of spaced inwardly projecting pairs of ears 5, to which the outer ends of tubes or cylinders 6 are hinged by means of pins 7, it being noted that the tubes are slightly longer than the cross-sectional internal radius of the casing and are provided with closures 8 adjacent the hinge pins.

A continuous inner ring or core member 9 of externally channelled form and semi-circular in cross section, is adapted to be fitted within the tire casing and to press against the side walls and beads thereof as indicated in Figure 3; and fitted between said rings or core members 1 and 9, are a series of coiled expansion springs 10, held in position by frictional engagement with the ears 5 of the outer ring or core member 1. The central portion of the member 9 is formed with a plurality of spaced rectangular openings 11, through which are projected the ear 14 carrying the stems or plungers 12 which are snugly received within the tubes 6, and equipped at their outer ends with washers 12ª or the like, for entrapping and compressing air in the tubes 6 to form air cushions and rebound checks. The plungers are hinged on pins 13 at their inner ends between pairs of ears 14 carried by short arcuate plates 15 adapted to press against the rim 16 of the wheel to provide a long bearing to cooperate with the non-rotatable fit of the ears 14 in said openings 11.

In assembling the device, the outer member 1 is first sprung inwardly to overlap its split ends and decrease its diameter in a manner similar to the manipulation of the ordinary rim when placing same in a casing, and is then inserted into the casing and its free edges are caused to engage or interlock, it being understood that the member will be of proper size for the particular casing and will snugly fit against the tread and side walls thereof. The springs 10 are now inserted and engaged with the ears 5 of the member 1, through the open side of the casing, and then the inner member 9 is disposed within the casing and outer member, effecting the compression of the springs 10, care being taken to properly locate the member 9 so that each spring shall be alined with one of the square openings 11 of the member.

The plungers 12 are now inserted into the tubes 6 through the openings 11, said openings being of rectangular shape to snugly receive the ears 14 to hold the device against accidental rotation. The engagement of the ears 14 with the ring openings 11 also maintains the parts of the device in their proper respective positions by guarding against invidual creepage.

The transversely split rim 16 of the wheel is now positioned within the tire in the common and ordinary manner, the flat foot or base portion 16 of the plungers pressing against said rim and guarding against the accidental tilting of the parts when subjected to the jars and vibrations of actual service.

In the use of the device, it will be noted that each plunger 12 traps air within its respective tube 6 and that the compression of air between the ends or closures 8 of said tubes and the plungers will form an effectual air cushion for retarding the relative movement of the springs, thus providing a shock absorber and rebound check.

From the above description, it will be apparent that I have produced a device possessing the features of advantage set forth as desirable, and while I have described and claimed the preferred embodiment of the same, it is to be understood that I reserve the right to make all changes properly falling within the spirit and scope of the appended claims.

I claim:

1. The combination of a wheel rim and tire casing thereon, spaced inner and outer ring members fitting in the casing one within the other, the outer member being transversely bowed outwardly and the inner member transversely bowed inwardly, plates fitting flatly against the peripheral surface of the rim and provided with lugs projecting outwardly through the inner ring member, and telescopically related tubes and plungers pivoted at their outer ends to the outer member and at their inner ends to said lugs.

2. The combination of a wheel rim and tire casing thereon, spaced inner and outer ring members fitting in the casing one within the other, the outer member being transversely bowed outwardly and the inner member transversely bowed inwardly, plates fitting flatly against the peripheral surface of the rim and provided with lugs projecting outwardly through the inner ring member, telescopically related tubes and plungers pivoted at their outer ends to the outer member and at their inner ends to said lugs; and springs between and exerting force outwardly and inwardly on the outer and inner members respectively.

In witness whereof I hereunto affix my signature.

DELMAR A. WALSH.